April 7, 1970 R. PROCHNOW ET AL 3,505,466
MAGNETIC TAPE SIGNAL TRANSDUCING APPARATUS
Filed March 23, 1966
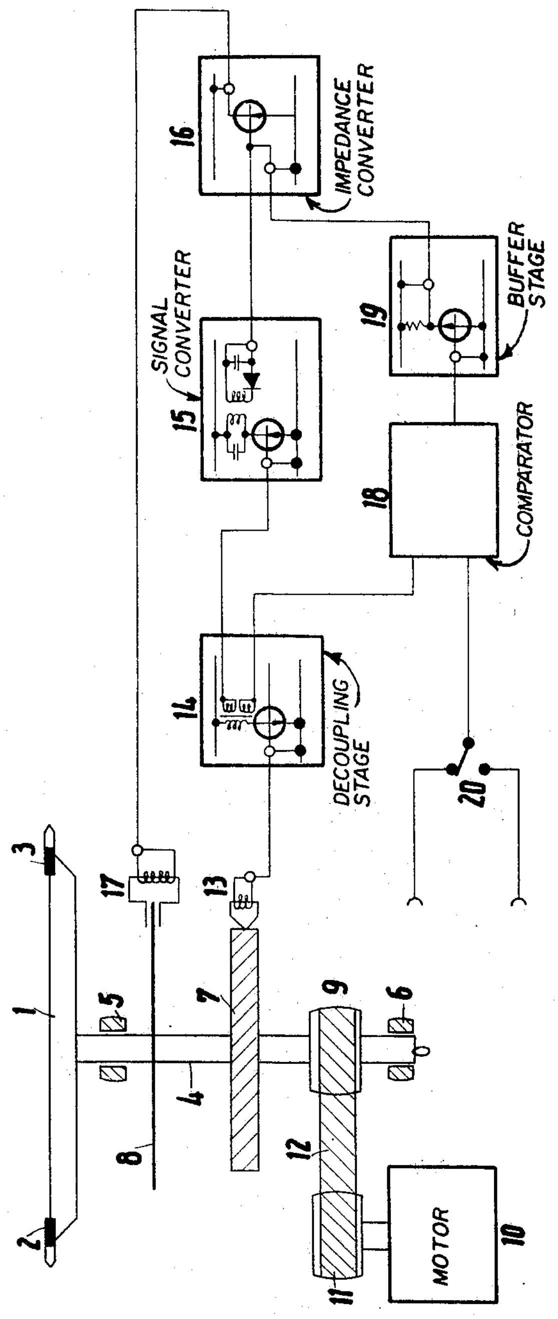
Inventors:
Rudolf Prochnow
Norbert Tebel
by Michael J. Striker
Attorney

United States Patent Office 3,505,466

Patented Apr. 7, 1970

3,505,466

MAGNETIC TAPE SIGNAL TRANSDUCING APPARATUS

Rudolf Prochnow and Norbert Tebel, Darmstadt-Eberstadt, Germany, assignors to Fernseh G.m.b.H., Darmstadt, Germany Filed Mar. 23, 1966, Ser. No. 536,693
Claims priority, application Germany, Mar. 26, 1965, F 45,639
Int. Cl. H04n *5/78;* G11b *5/52*
U.S. Cl. 178—6.6 5 Claims

ABSTRACT OF THE DISCLOSURE

A magnetic tape signal transducing arrangement in which a transducer head assembly is rotated at a speed higher than a desired nominal value. A member rotating with the transducer head assembly, has recorded upon it an oscillatory signal having a frequency which is a multiple of the norminal frequency corresponding to the desired angular speed of the member and of the transducer head assembly. The signal frequency from the oscillatory recorded signal is compared to the desired nominal frequency, and an eddy brake mechanically coupled to the transducer head assembly brakes the speed of the assembly, so as to result in the desired nominal speed. The driving source of the transducer head assembly is a synchronous motor through an elastic transmission.

This invention relates to magnetic tape signal transducing apparatus and in particular to an arrangement for controlling the angular velocity and angular position of the head drum in apparatus for the magnetic storage of television signals or the like in tracks inclined or transverse to the magnetic tape by means of magnetic heads arranged on the circumference of the rotating head wheel with the help of a control voltage obtained by comparison of a signal taken from the head wheel assembly with a reference signal.

The arrangement according to the invention is particularly suitable for use in television magnetic tape apparatus, in which the recording of the television signal is effected in tracks slightly inclined to the longitudinal direction of the magnetic tape by means of magnetic heads arranged on the circumference of a head wheel. In known apparatus of this kind the magnetic tape runs in the form of a helix around a divided drum, while the head wheel rotates concentrically to the axis of the drum and the magnetic heads bear on the magnetic tape through the annular strip between the two halves of the drum. In a known form of apparatus of this kind the magnetic tape embraces the drum over the whole of its circumference and the head wheel provided with a magnetic head rotates at the field frequency, so that one track of the signal contains the field signal. Taking as a basis the European television standard with 25 frames per second and 50 fields per second the head drum then makes 50 revolutions per second, corresponding to 3,000 revolutions per minute. In another known construction the magnetic tape is led around only somewhat more than half the circumference of the drum and the head-wheel carries two heads displaced around its circumference by 180°. The speed of revolution of the head-wheel correspondingly amounts to 25 revolutions per second, or 1500 revolutions per minute.

The arrangement may also be used with advantage in known devices for the magnetic recording of television signals in which the recording in effected in tracks transverse to the magnetic tape by means of a head wheel with four heads spaced at 90° around its circumference and in which the magnetic tape is shaped to the circular path of the magnetic heads by means of a guide concentric with the head wheel to engage the wheel over an angle of something more then 90°.

In the first mentioned kind of apparatus using recording in inclined tracks the requirement exists that the head wheel shall be driven at 1500 or at 3000 revolutions per minute exactly synchronously with the frame frequency during recording. In the last mentioned equipment using recording in transverse tracks this requirement is not so stringent, though synchronism is preferred in order that the synchronising impulses in the television signal shall always occur at the same position on a track.

In all cases the angular velocity and the angular position of the head wheel must be controlled during playback of the television signals in such a manner that the magnetic head always traverses the recorded tracks.

The requirements discussed above were formerly fulfilled by a control system operating in the following manner: an impulse generator on the head wheel assembly generates one impulse per revolution. During recording this is compared in phase with the vertical synchronising impulse of the recorded television signal or with a multiple thereof and the control voltage proportional to the phase deviation is employed to influence the frequency and/or the driving power of an alternating current motor which drives the head wheel directly or through a rigid coupling. During playback either the mains frequency, the vertical synchronising signal of the recorded television signal, or a control signal of e.g. 250 kc./s. recorded in a longitudinal tape of a magnetic tape, may be used as the comparison frequency.

The control system described above is only capable of correcting the angular velocity and the angular position of the head wheel once during each revolution of the wheel. The head wheel therefore runs unregulated during almost a complete revolution, so that a relatively large error may arise during the course of a revolution and on the other hand non-uniform fluctuations of the angular velocity within one revolution, which may result for example from non-uniformities in the bearing friction or in the frictional resistance between the tape and the heads, will for the most part not be regulated. In addition the control system formerly used possesses a large time-constant. Control is effected only relatively slowly and exhibits a slow run-up time to the nominal value. Despite this the control system requires a considerable amount of complex electronics.

These disadvantages may be avoided if the comparison between nominal and actual values is effected oftener than once during the revolution of a head wheel. It has, therefore, already been proposed to construct the impulse generator in such a manner that it provides several comparison impulses in the course of one revolution. To this end it has therefore been attempted to place on the head wheel shaft, instead of one mark, for example, five marks uniformly distributed about the circumference. This investigation has not yielded satisfactory results however since it has up to now not proved possible to produce the necessary fine positional accuracy of the marks. Very complicated optical processes of division have meant at the most a positional accuracy of ± three seconds of arc. However this is not sufficient and an inaccurate division can thus result in errors in the angular position of the head wheel which were not originally present.

A complete solution of the problems discussed above in processes for the control of the angular velocity and angular position of the head wheel in apparatus for the magnetic storage of television signals, for example in tracks transverse or inclined to the length of the magnetic tape by means of magnetic heads arranged on the circumference of the rotating head wheel with the help of a control voltage obtained by comparison of a signal taken from the head wheel shaft and a reference signal, is obtained in accordance with the invention by providing a magnetic record apparatus in which signals are recorded upon or played back from tracks extending transversely or inclined to the longitudinal direction of a magnetic tape by means of at least one magnetic transducer head carried upon a revoluble assembly, wherein a record member rotating concentrically with said assembly carries a trace representing an oscillation having a frequency which is a multiple of the frequency of revolution of said assembly which is reproduced from the trace and is converted into a current related to the effective frequency of said oscillation which in turn is applied to energise brake means arranged to exert a retarding torque on said assembly, together with drive means operable when said brake means is unenergised to rotate said assembly at a speed higher than a desired nominal frequency of revolution, whereby the speed of said assembly is controlled to said nominal value.

Since the frequency of the oscillation recorded on the concentric track is a multiple of the speed of revolution, the recording consists of a continuous oscillation, of which the beginning and the end overlap without any discontinuity in phase. The use of special methods make it possible to effect the recording of the oscillation with an accuracy of substantially more than ±3 seconds of arc.

The frequency of the oscillation is preferably equal to twice the line frequency, that is, for the European television standard 31.5 kc./s. In an apparatus with one head, which records the signal of one field in a single track, the nominal speed of revolution of the head-wheel amounts to 3000 revolutions per minute or 50 revolutions per second. The circumference of the head drum shaft is divided into exactly 625 parts by the recorded oscillation of twice-line frequency. In the two-head machine in which the head wheel rotates at 1500 revolutions per minute or 25 revolutions per second, 1250 oscillations of the twice-line frequency are recorded about the circumference of the head-wheel shaft. Even in an apparatus with four heads, however, in which the head-wheel rotates at 1500 revolutions per minute or 25 revolutions per second, it is possible to produce 125 oscillations on the circumference of the head-wheel.

Comparison of the oscillation played back from the concentric track with a reference signal of constant frequency equal to twice the line frequency is therefore effected up to 1250 times within each revolution. Thus even the very smallest deviations from the nominal speed of rotation of the head-wheel are controlled before the error can become larger.

An eddy current brake on the head-wheel shaft is used to influence the speed of rotation and the angular position of the head-wheel. It is thus ensured that the transmission of the control to the head-wheel shaft is effected with the smallest delay and with high efficiency. Preferably the shaft of the head-wheel with the drum of the impulse generator and the disc of the eddy current brake fitted upon it is not driven directly by a motor, as is often the case in known arrangements with four recorded heads on the head wheel, but the drive is effected indirectly by way of an elastic slipping drive.

By the use of the method according to the invention it is possible to obtain a uniformity of the circumferential velocity of the magnetic head which could not previously be obtained, both during the recording and also during playing back of stored television signals.

The invention will now be further described with reference to the accompanying figure which is a partly schematic diagram showing one embodiment of those portions of television magnetic tape recording equipment with which the present invention is concerned. The apparatus described employs a head-wheel 1 carrying two magnetic heads 2, 3 and rotating at a speed of 1500 revolutions per minute. The two heads traverse tracks inclined to the direction of the magnetic tape, each track containing the signal corresponding to one field of the television scanning operation. In the figure only those portions of the apparatus which are necessary to the understanding of the invention are shown. The head-wheel 1 carrying the two heads 2, 3 displaced from one another by 180° is secured directly to a shaft 4 which is mounted for rotation in bearings 5, and 6. On the shaft 4 is situated a drum 7 of which the circumference is provided with a magnetic layer. On the magnetic layer there is recorded a signal of twice the line frequency of the television signal, that is a signal having a frequency of 31.5 kc./s. The recording is effected in such a manner that exactly 1250 oscillations are recorded with positional accuracy substantially higher than ±3 seconds of arc. The drum 7 may consist for example of brass and may have a diameter of 80 mm. In addition there is secured to the shaft 4 the disc 8 of an eddy current brake.

The head wheel shaft 4, with the head wheel 1, drum 7 and disc 8 is driven from a motor 10 by way of an elastic belt drive. Motor 10 may be for example a hysteresis synchronous motor which is fed from the 50 c./s. alternating current mains, and may have a synchronous speed of 1500 revolutions per minute. A flat rubber belt 12 transmits the drive from a pulley 11 on the motor shaft to a pulley 9 on the head drum shaft 4. The diameter of pulley 9 is somewhat smaller than that of pulley 11, so that the head wheel 4 runs at a speed somewhat higher than the synchronous speed of 1500 revolutions per minute, so long as the eddy current brake is not excited.

A fixed magnetic head 13 is arranged opposite the magnetic layer of the drum 7, spaced from it by a small distance, e.g. 50$\mu$. At the nominal speed of the shaft 4 (1500 r.p.m.) head 13 will thus provide an alternating voltage having the twice-line frequency of 31.5 kc./s. This alternating voltage is amplified in an amplifier 14, as schematically illustrated, and is applied from the amplifier to a device 15 which supplies an output voltage proportional to the frequency of the input signal. To this end the device 15, may as indicated in the drawing, contain an oscillatory circuit to which the alternating input signal is applied by way of a transistor. The resonant frequency of the oscillatory circuit in the device 15 is so chosen that the nominal frequency of 31.5 kc./s. lies on the flank of the amplitude frequency response curve of the oscillatory circuit. The voltage appearing on the resonant circuit thus changes approximately in proportion to the value of the frequency. The direct voltage provided by the device 15 is therefore likewise approximately proportional to the frequency of the alternating voltage supplied by the impulse generator 13. Finally the frequency-dependent voltage supplied by the device 15 is applied by way of an impedance converter 16 to the winding of the magnet 17 of the eddy current brake.

In this manner the angular velocity of the head-wheel is continuously controlled and brought to practically the same accuracy as the divisions on the drum 7. There is thus produced a simpler, more rapid and continuously closed control circuit for the speed of rotation of the head-wheel, which has a high loop-gain. Disturbing torques, such as those due to varying tape friction or bearing friction, are in this manner immediately compensated. The head drive need not therefore meet the extremely high requirements of accuracy formerly necessary and may be made simpler, as illustrated in the drawing.

However the position of the head-wheel with respect to the television signal is not yet defined by the control arrangement described. In addition the condition must be fulfilled, that the vertical synchronising impulse always assumes a definite position in comparison to the recording. In the present example of an apparatus with two heads, each track of the signal should contain one field and the vertical synchronising impulse should appear at the transition from one track to the next. In order to fix the position of the head-wheel in relation to the television signal, a second control is also provided, the control voltage for which is formed by comparison of the vertical synchronising impulses in the television signal and the angular position of the head-wheel. For this purpose a further impulse generator, which yields one impulse per revolution of the head-wheel, may be fitted in known manner on the head-wheel shaft. This impulse, which in the present example corresponds to the vertical frequency, and thus appears 25 times per second, is now compared in a phase comparison stage with the vertical synchronising impulses of the television signal. The phase-comparison stage supplies a voltage of which the magnitude and polarity depend upon the time-interval between the pulses derived from the head-wheel shaft and the vertical synchronising impulses. This control voltage is also made use of to determine by means of the eddy current brake the angular position of the head-wheel in relation to the television signal.

In order to omit a second impulse generator from the head-wheel shaft for this purpose, the impulse generator 7, 13 is, in accordance with an extension of the invention, constructed so that in addition to a signal having a frequency which is a multiple of the frequency of rotation, it provides also a signal having this frequency itself. For this purpose the recording of the twice-line frequency on the drum 7 is attenuated for a short time at one position. There thus results once during each revolution of the shaft 4 a signal of impulse form in addition to the alternating voltage of twice-line frequency. These signals are decoupled in the stage 14 and are applied to a device 18, in which the impulse is separted from the alternating voltage and is compared in phase with the vertical synchronising impulse. By way of a buffer stage 19 the control voltage obtained in this manner is added to the control voltage from the device 15 and together with this is amplified in impedance converter 16 and applied to the winding of the eddy current brake.

In the recording of the television signal the vertical frequency comparison impulse is taken from the television signal to be recorded in known manner by way of an amplitude separator and a pulse separator stage and in the "Record" setting of the change-over switch 20 is applied to the phase comparison stage 18. During playback of the stored television signal the recorded television signal is made use of for this purpose, the vertical synchronising impulse being separated from it and applied to the stage 18 in the "Playback" position of the switch 20. In this manner it is ensured that both during recording and also during playback the signal of one field is alway recorded in a single track and that during playback the heads assume the same position in relation to the tracks as during recording.

What we claim is:

1. Magnetic tape signal transducing apparatus comprising in combination: a transducer head assembly including a magnetic transducer head and mounted for rotation about an axis; drive means operable to rotate said assembly at a speed higher than a desired nominal frequency of revolution; a magnetic tape; transport means operable to effect longitudinal translation of said tape; guide means presenting said tape to said transducer head assembly whereby said transducer head traverses said tape along tracks inclined to the longitudinal direction thereof; a record member concentric with said assembly and mounted for rotation therewith; a control signal record trace on said member representing an oscillation having at said desired nominal frequency of revolution of said assembly a frequency which is a multiple of said nominal frequency; control signal reproducer means positioned to reproduce said control signal trace; brake means operable by an applied electric current to apply a retarding torque to said assembly; control circuit means responsive to an applied signal of varying frequency to develop an electric current having an amplitude predeterminedly related to said frequency; circuit means applying said reproduced control signal to said control circuit means; and circuit means applying said current from said control circuit means to said brake means thereby to control said assembly speed to said nominal frequency, said signals being television signals having horizontal frequency and vertical frequency components, the frequency of said oscillation being equal to twice the horizontal frequency of said television signal component.

2. Magnetic tape signal transducing apparatus comprising in combination: a transducer head assembly including a magnetic transducer head and mounted for rotation about an axis; drive means operable to rotate said assembly as a speed higher than a desired nominal frequency of revolution; a magnetic tape; transport means operable to effect longitudinal translation of said tape; guide means presenting said tape to said transducer head assembly whereby said transducer head traverses said tape along tracks inclined to the longitudinal direction thereof; a record member concentric with said assembly and mounted for rotation therewith; a control signal record trace on said member representing an oscillation having at said desired nominal frequency of revolution of said assembly a frequency which is a multiple of said nominal frequency; control signal reproducer means positioned to reproduce said control signal trace; break means operable by an applied electric current to apply a retarding torque to said assembly; control circuit means responsive to an applied signal of varying frequency to develop an electric current having an amplitude predeterminedly related to said frequency; circuit means applying said reproduced control signal to said control circuit means; circuit means applying said current from said control circuit means to said brake means thereby to control said assembly speed to said nominal frequency, said signals being television signals having horizontal frequency and vertical frequency components, the frequency of said oscillation being equal to twice the horizontal frequency of said television signal component; comparator means operable to derive a current related in amplitude to the phase relation between signals applied thereto; circuit means applying said vertical-frequency component of said television signal to said comparator; pulse generator means including an element mounted for rotation with said transducer assembly operable to generate a pulse once per revolution of said assembly; circuit means applying said pulse to said comparator; and means applying said current from said comparator also to said brake means.

3. Magnetic tape signal transducing apparatus comprising in combination: a transducer head assembly including a magnetic transducer head and mounted for rotation about an axis; drive means operable to rotate said assembly at a speed higher than a desired nominal frequency of revolution; a magnetic tape; transport means operable to effect longitudinal translation of said tape; guide means presenting said tape to said transducer head assembly whereby said transducer head traverses said tape along tracks inclined to the longitudinal direction thereof; a record member concentric with said assembly and mounted for rotation therewith; a control signal record trace on said member representing an oscillation having at said desired nominal frequency of revolution of said assembly a frequency which is a multiple of said nominal frequency; control signal reproducer means positioned to reproduce said control signal trace; brake means operable by an applied electric current to apply a retarding torque to said assembly; control circuit means responsive to an applied signal of varying frequency to develop an electric current having an amplitude predeterminedly related to said frequency; circuit means applying said reproduced control signal to said control circuit means; and circuit means applying said current from said control circuit means to said brake means thereby to control said assembly speed to said nominal frequency, said control means comprising: an oscillatory circuit having a predetermined resonant frequency, said resonant frequency being so chosen that when said shaft rotates at said nominal frequency the frequency of said control signal lies upon a flank of the amplitude/frequency response curve of said resonant circuit; means responsive to an applied voltage to develop a current predeterminedly related thereto; means applying said reproduced control signal to excite oscillations in said resonant circuit; and means applying the voltage developed across said resonant circuit to said voltage-responsive means.

4. Magnetic tape signal transducing apparatus comprising in combination: a transducer head assembly including a magnetic transducer head and mounted for rotation about an axis; drive means operable to rotate said assembly at a speed higher than a desired nominal frequency of revolution; a magnetic tape; transport means operable to effect longitudinal translation of said tape; guide means presenting said tape to said transducer head assembly whereby said transducer head traverses said tape along tracks inclined to the longitudinal direction thereof; a record member concentric with said assembly and mounted for rotation therewith; a control signal record trace on said member representing an oscillation having at said desired nominal frequency of revolution of said assembly a frequency which is a multiple of said nominal frequency; control signal reproducer means positioned to reproduce said control signal trace; brake means operable by an applied electric current to apply a retarding torque to said assembly; control circuit means responsive to an applied signal of varying frequency to develop an electric current having an amplitude predeterminedly related to said frequency; circuit means applying said reproduced control signal to said control circuit means; circuit means applying said current from said control circuit means to said brake means thereby to control said assembly speed to said nominal frequency, said signals being television signals having horizontal frequency and vertical frequency components, the frequency of said oscillations being equal to twice the horizontal frequency of said television signal component; comparator means operable to derive a current related in amplitude to the phase relation between signals applied thereto; circuit means applying said vertical-frequency component of said television signal to said comparator; pulse generator means including an element mounted for rotation with said transducer assembly operable to generate a pulse once per revolution of said assembly; circuit means applying said pulse to said comparator; and means applying said current from said comparator also to said brake means, an oscillation recorded upon said record member being varied in amplitude at a predetermined position, whereby signals reproduced from said record member by said control signal reproducer means include a pulse component repetitive once per revolution of said head-wheel, said pulse generator means including separator means operating when fed with a combined signal including alternating and pulse signal components to separate said pulse component from said combined signal; together with means applying signals from said control reproducer head to said separator means and means applying said pulse component from said separator means to said comparator means.

5. Magnetic tape signal transducing apparatus comprising in combination: a transducer head assembly including a magnetic transducer head and mounted for rotation about an axis; drive means operable to rotate said assembly at a speed higher than a desired nominal frequency of revolution; a magnetic tape; transport means operable to effect longitudinal translation of said tape; guide means presenting said tape to said transducer head assembly whereby said transducer head traverses said tape along tracks inclined to the longitudinal direction thereof; a record member concentric with said assembly and mounted for rotation therewith; a control signal record trace on said member representing an oscillation having at said desired nominal frequency of revolution of said assembly a frequency which is a multiple of said nominal frequency; control signal reproducer means positioned to reproduce said control signal trace; brake means operable by an applied electric current to apply a retarding torque to said assembly; control circuit means responsive to an applied signal of varying frequency to develop an electric current having an amplitude predeterminedly related to said frequency; circuit means applying said reproduced control signal to said control circuit means; and circuit means applying said current from said control circuit means to said brake means thereby to control said assembly speed to said nominal frequency, said drive means comprising electric motor and elastic belt drive means coupling said motor to said shaft to produce rotation thereof at a speed substantially higher than said nominal frequency.

References Cited

UNITED STATES PATENTS 3,016,428 1/1962 Kabell.
3,046,463 7/1962 Johnson.
3,071,644 1/1963 Olive.

ROBERT L. GRIFFIN, Primary Examiner

H. W. BRITTON, Assistant Examiner

U.S. Cl. X.R.

179—100.2